United States Patent [19]

Katayama

[11] Patent Number: 5,422,736
[45] Date of Patent: Jun. 6, 1995

[54] MULTI-MODE IMAGE PROCESSING PERMITTING SELECTION OF QUANTIZATION PROCESS ACCORDING TO IMAGE CHARACTERISTICS

[75] Inventor: Akihiro Katayama, Kawasaki, Japan

[73] Assignee: Canon Kabushiki Kaisha, Tokyo, Japan

[21] Appl. No.: 855,081

[22] Filed: Mar. 20, 1992

[30] Foreign Application Priority Data

Mar. 22, 1991 [JP] Japan .................................. 3-058810
Mar. 22, 1991 [JP] Japan .................................. 3-058818

[51] Int. Cl.⁶ ............................................. H04N 1/46
[52] U.S. Cl. .................................... 358/462; 358/404; 348/395; 348/405; 348/420
[58] Field of Search ................ 358/133, 13, 135, 138, 358/433, 261.2, 404, 105, 433, 75, 80, 283, 260, 141, 136, 125, 462; 382/56, 43

[56] References Cited

U.S. PATENT DOCUMENTS

| | | | |
|---|---|---|---|
| 3,984,626 | 10/1976 | Mounts et al. | 178/6 |
| 4,691,329 | 9/1987 | Juri et al. | 358/133 |
| 4,723,129 | 2/1988 | Endo et al. | 346/1.1 |
| 4,723,161 | 2/1988 | Koga | 358/136 |
| 4,797,742 | 1/1989 | Sugiyama et al. | 358/135 X |
| 4,862,262 | 8/1989 | Tanaka | 358/133 |
| 4,887,151 | 12/1989 | Wataya | 358/80 |
| 5,025,482 | 6/1991 | Murakami et al. | 382/56 |
| 5,028,995 | 7/1991 | Izawa et al. | 358/135 |
| 5,045,925 | 9/1991 | Saito | 358/13 |
| 5,073,821 | 12/1991 | Juri | 358/133 |
| 5,162,923 | 11/1992 | Yoshida et al. | 358/433 |
| 5,184,316 | 2/1993 | Sugiyama | 364/715.02 |
| 5,185,655 | 2/1993 | Wakeland | 358/138 |
| 5,241,401 | 8/1993 | Fujiwara et al. | 358/404 |
| 5,253,054 | 10/1993 | Fujiwara et al. | 358/133 |
| 5,253,075 | 10/1993 | Sugiyama | 358/261.2 |

Primary Examiner—Paul Ip
Attorney, Agent, or Firm—Fitzpatrick, Cella, Harper & Scinto

[57] ABSTRACT

The present invention aims at an efficient encoding of image data while maintaining the quality of the image. It has been a conventional practice that coefficients obtained from DCT (discrete cosine transformation) are quantized using a single quantization table. If, however, an identical quantization is performed for images that are considerably dissimilar in their statistical characteristic, deterioration of image occurs especially at character portions where high frequency dominates. In the present invention, a statistical characteristic of a previous block is obtained and a suitable table is selected from a plurality of quantization tables to achieve improved image quality.

28 Claims, 17 Drawing Sheets

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 12B

| | | | | | | | |
|---|---|---|---|---|---|---|---|
| 15 | 10 | 10 | 15 | 23 | 40 | 51 | 61 |
| 11 | 11 | 13 | 17 | 24 | 58 | 60 | 55 |
| 12 | 12 | 15 | 22 | 40 | 57 | 69 | 56 |
| 13 | 16 | 22 | 27 | 50 | 87 | 80 | 62 |
| 18 | 22 | 35 | 56 | 66 | 105 | 100 | 77 |
| 24 | 35 | 55 | 64 | 80 | 102 | 110 | 92 |
| 49 | 64 | 77 | 87 | 100 | 118 | 117 | 100 |
| 72 | 92 | 94 | 96 | 110 | 95 | 100 | 96 |

FIG. 12C

| | | | | | | | |
|---|---|---|---|---|---|---|---|
| 17 | 18 | 24 | 47 | 99 | 99 | 99 | 99 |
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

FIG. 12D

| | | | | | | | |
|---|---|---|---|---|---|---|---|
| 16 | 18 | 23 | 47 | 80 | 99 | 99 | 99 |
| 18 | 20 | 24 | 60 | 83 | 99 | 99 | 99 |
| 23 | 24 | 53 | 82 | 85 | 99 | 99 | 99 |
| 47 | 60 | 82 | 85 | 85 | 99 | 99 | 99 |
| 80 | 83 | 85 | 85 | 90 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

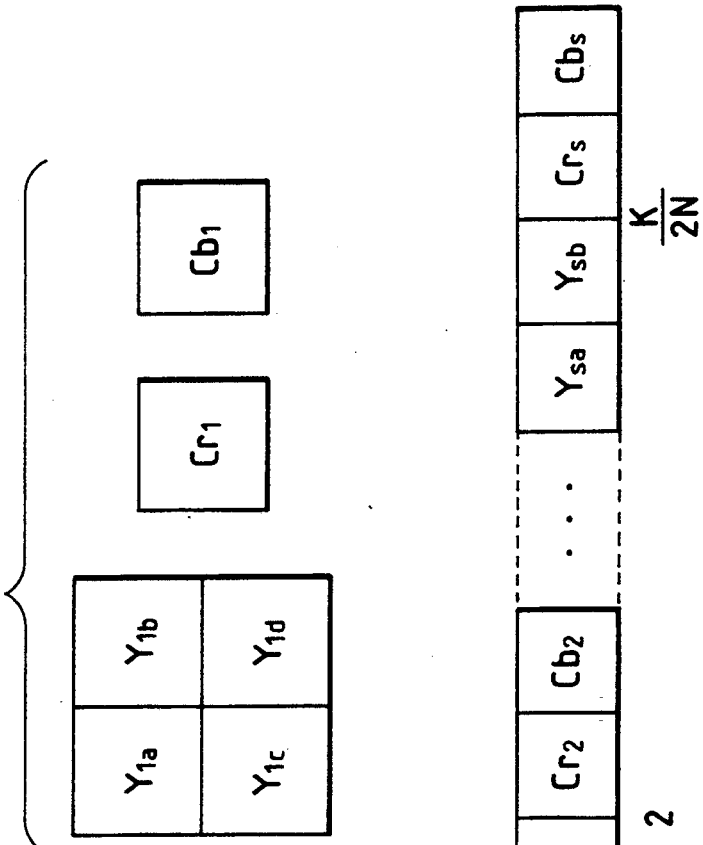
FIG. 13
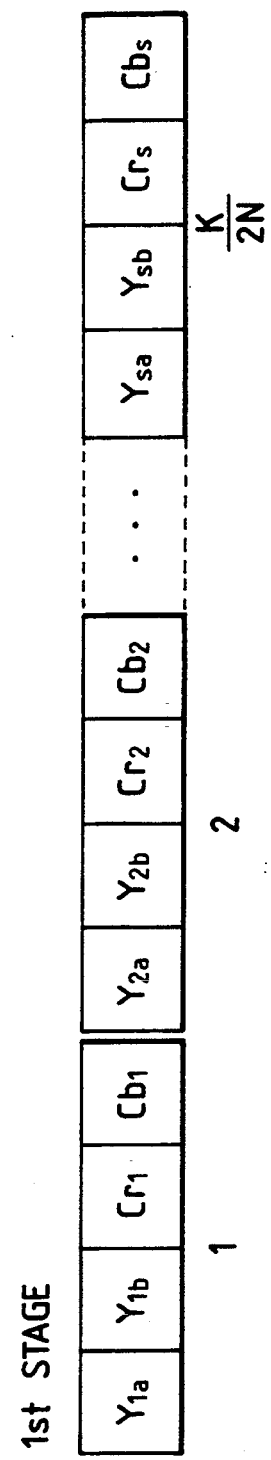
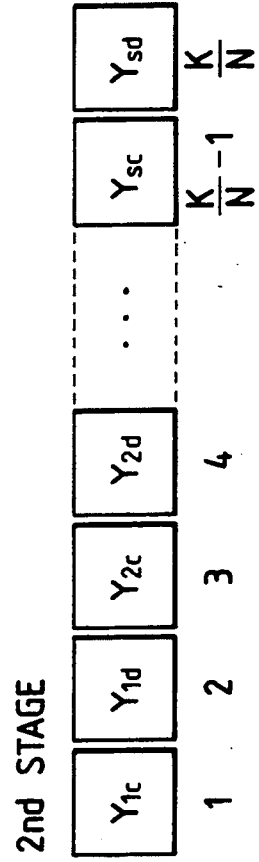
FIG. 14

FIG. 16

| SSSS GROUP NUMBER | DC DIFFERENCE | ADDITIONAL BIT NUMBER |
|---|---|---|
| 0 | 0 | 0 |
| 1 | - 1 , 1 | 1 |
| 2 | - 3 ,- 2 , 2 ,3 | 2 |
| 3 | - 7 ..- 4 , 4 ..7 | 3 |
| 4 | - 15 ..- 8 , 8 ..15 | 4 |
| 5 | - 31 ..- 16 , 16 ..31 | 5 |
| 6 | - 63 ..- 32 , 32 ..63 | 6 |
| 7 | - 127 ..- 64 , 64 ..127 | 7 |
| 8 | - 255 ..- 128 , 128 ..255 | 8 |
| 9 | - 511 ..- 256 , 256 ..511 | 9 |
| 10 | - 1023 ..- 512 , 512 ..1023 | 10 |
| 11 | - 2047 ..- 1024 , 1024 ..2047 | 11 |
| 12 | - 4095 ..- 2048 , 2048 ..4095 | 12 |
| 13 | -.8191 ..- 4096 , 4096 ..8191 | 13 |
| 14 | - 16383 ..- 8192 , 8192 ..16383 | 14 |
| 15 | - 32767 ..- 16384 , 16384 ..32767 | 15 |

FIG. 17

| GROUP NUMBER | CODE LENGTH | INDEX VALUE | CODE |
|---|---|---|---|
| 1 | 1 | 1 | 1 |
|   |   | -1 | 0 |
| 2 | 2 | 3 | 11 |
|   |   | 2 | 10 |
|   |   | -2 | 01 |
|   |   | -3 | 00 |
| 3 | 3 | 7 | 111 |
|   |   | 6 | 110 |
|   |   | 5 | 101 |
|   |   | 4 | 100 |
|   |   | -4 | 011 |
|   |   | -5 | 010 |
|   |   | -6 | 001 |
|   |   | -7 | 000 |
| 4 | 4 | 15 | 1111 |
|   |   | 14 | 1110 |
|   |   | 13 | 1101 |
|   |   | 12 | 1100 |
|   |   | 11 | 1011 |
|   |   | 10 | 1010 |
|   |   | 9 | 1001 |
|   |   | 8 | 1000 |
|   |   | -8 | 0111 |
|   |   | -9 | 0110 |
|   |   | -10 | 0101 |
|   |   | -11 | 0100 |
|   |   | -12 | 0011 |
|   |   | -13 | 0010 |
|   |   | -14 | 0001 |
|   |   | -15 | 0000 |
| ⋮ | ⋮ | ⋮ | ⋮ |

| GROUP NUMBER | CODE LENGTH | INDEX VALUE | CODE |
|---|---|---|---|
| 9 | 9 | 511 | 11 11 11 11 1 |
|   |   | 510 | 11 11 11 11 0 |
|   |   | 509 | 11 11 11 10 1 |
|   |   | 508 | 11 11 11 10 0 |
|   |   | 507 | 11 11 11 01 1 |
|   |   | 506 | 11 11 11 01 0 |
|   |   | -506 | 00 00 00 10 1 |
|   |   | -507 | 00 00 00 10 0 |
|   |   | -508 | 00 00 00 01 1 |
|   |   | -509 | 00 00 00 01 0 |
|   |   | -510 | 00 00 00 00 1 |
|   |   | -511 | 00 00 00 00 0 |
| ⋮ | ⋮ | ⋮ | ⋮ |

FIG. 18

| SSSS GROUP NUMBER | AC DIFFERENCE | ADDITIONAL BIT NUMBER |
|---|---|---|
| 1 | −1 , 1 | 1 |
| 2 | −3 ,−2 , 2 ,3 | 2 |
| 3 | −7 ..−4 , 4 ..7 | 3 |
| 4 | −15 ..−8 , 8 ..15 | 4 |
| 5 | −31 ..−16 , 16 ..31 | 5 |
| 6 | −63 ..−32 , 32 ..63 | 6 |
| 7 | −127 ..−64 , 64 ..127 | 7 |
| 8 | −255 ..−128 , 128 ..255 | 8 |
| 9 | −511 ..−256 , 256 ..511 | 9 |
| 10 | −1023 ..−512 , 512 ..1023 | 10 |
| 11 | −2047 ..−1024 , 1024 ..2047 | 11 |
| 12 | −4095 ..−2048 , 2048 ..4095 | 12 |
| 13 | −8191 ..−4096 , 4096 ..8191 | 13 |
| 14 | −16383 ..−8192 , 8192 ..16383 | 14 |
| 15 | −32767 ..−16384 , 16384 ..32767 | 15 |

MULTI-MODE IMAGE PROCESSING PERMITTING SELECTION OF QUANTIZATION PROCESS ACCORDING TO IMAGE CHARACTERISTICS

BACKGROUND OF THE INVENTION

1. Field of the Invention

The present invention relates to image precessing method and apparatus applicable to a color facsimile, color image file and the like.

2. Related Background Art

Adaptive discrete cosine transformation (ADCT) coding system has been known as a highly efficient coding. Such system is summarized as follows:

1) Input image is converted into YCrCb signals and, considering human visual characteristics, is sampled at a ratio of Y:Cr:Cb=4:1:1 or 4:2:2. A description will be given below with respect to a case of using the 4:1:1 ratio.

2) The image is divided into N×N (8×8 for example) pixel blocks, and each N×N block is subjected as a unit to a cosine transformation.

3) The transformed coefficient is quantized by a suitable quantization step (for example using a quantization matrix as shown in FIGS. 3A–3C).

4) For a DC (direct current) component, the difference in DC component from the previous block is used, and the resulting value is converted into Huffman code.

5) For an AC (alternating current) component, a conversion into one-dimensional series is first made by means of zigzag scan (as shown in FIG. 7), and Huffman coding is performed on the basis of non-0 coefficient and the length of zero-run up to that point.

6) The above described steps 2) to 5) are performed with respect to each of the Y, Cr, and Cb components, and as shown in FIG. 13 one block each of Cr, Cb components is transmitted for every four blocks of Y component (such one block of Cr, Cb of course, is one which corresponds to the four blocks of Y component).

At the decoding side, decoded image is obtained by performing the inverse process of the above described Steps 1) to 6).

In the conventional example as described, however, there has been a problem that, since the same quantization matrix is used for images of dissimilar statistical characteristics, an optimal quantization may not be performed, thereby lowering the quality of picture imiage.

Further, since in the above described conventional example four blocks of Y component and one block each of Cr, Cb components are sent in a combination, it is necessary to provide memories for 6N (2N for each of R, G, B, i.e., 48) lines if they are to be decoded by lines at the decoder side.

For this reason, there has been a problem in that the circuit structure at the decoding side is increased in size.

Furthermore, such problem similarly exists also at the encoding side.

SUMMARY OF THE INVENTION

The present invention aims at eliminating the problems in the related art as described.

Accordingly, it is an object of the present invention to provide a method and apparatus for processing image by which a highly efficient coding is possible while maintaining image quality.

To this end, an image processing apparatus of the present invention comprises: generation means for generating luminance information and color information for each pixel; means for dividing the color and the luminance information into blocks; first and second quantization means for quantizing by blocks of predetermined size the luminance information and the color information; and first and second control means for determining first and second quantization steps, for use by the first and second quantization means respectively.

In another aspect of the present invention, an image processing method is provided including the steps of: generating luminance information and color information for each pixel; dividing the color information and the luminance information into blocks; and quantizing by blocks of predetermined size the luminance information and the color information; and wherein the quantization step is caused to vary for the luminance information in accordance with image type of the block but does not so vary for the color information.

Another object of the present invention is to provide an efficient transmission of image data and the simplification of circuit structure.

To this end, an image processing apparatus of the present invention comprises: means for generating luminance and color information representing a color image; means for encoding the luminance and the color information by blocks each consisting of a plurality of pixels; and means for outputting luminance and color information encoded by the encoding means, wherein the output means has two modes, in one of which it outputs the encoded color information in block to be output prior to luminance information for the block and in a second of which the color information is output after the luminance information for the block.

In another aspect of the present invention, a method for processing image comprises the steps of: generating luminance and color information representing a color image signal; encoding the luminance and the color information by blocks each consisting of a plurality of pixels; and outputting encoded luminance and color information, using selectively both a first output mode, where encoded color information is output prior to encoded luminance information for the same block, and a second output mode, where encoded color information is output after encoded luminance information for the same block.

In still another aspect of the present invention, an image processing apparatus comprises: means for inputting encoded luminance and color information; and means for decoding the encoded luminance and color information wherein the input means has both a first input mode, where encoded color information for a block is input prior to encoded luminance information for that block and a second input mode, where encoded information is after encoded luminance information for that block.

In another aspect of the present invention, a method for processing image comprises the steps of inputting encoded luminance and color information and decoding the same, and wherein both a first input mode, for inputting encoded color information prior to encoded luminance information for a block, and a second input mode, for inputting encoded color information after encoded luminance information for that block, signal are provided.

In another aspect of the present invention, an image processing apparatus comprises: means for generating luminance and color information representing a color image; and transmission means for transmitting by predetermined lines the luminance and the color information wherein the transmission means is provided with both a transmission mode where the color information is transmitted during the transmission of the luminance information corresponding to one line, and a transmission mode where the transmission of the luminance information corresponding to one line is consecutively performed.

In another aspect of the present invention, a method for processing an image comprises the steps of generating luminance and color information representing a color image and transmitting by predetermined lines the luminance and the color information, wherein both a transmission mode for transmitting color information during transmission of the luminance information corresponding to one line and a transmission mode for performing consecutive transmission of the luminance information corresponding to one line, are provided.

Further objects and features of the present invention will be apparent from the following description taken with the accompanying drawings, and from the scope of appended claims.

BRIEF DESCRIPTION OF THE DRAWINGS

FIGS. 3A to 3C each show an example of a quantization table;

FIGS. 12A to 12D each shows an example of quantization table of Embodiment 2;

FIG. 13 shows data structure at the time of a conventional block interleaving;

FIG. 14 shows the block interleaving method of the present invention;

FIG. 16 is a table for grouping the difference values of DC coefficient;

FIG. 17 is a table of additional bits;

FIG. 18 is a table for grouping AC coefficients; and

DESCRIPTION OF THE PREFERRED EMBODIMENTS

Embodiment 1

Figure 1:
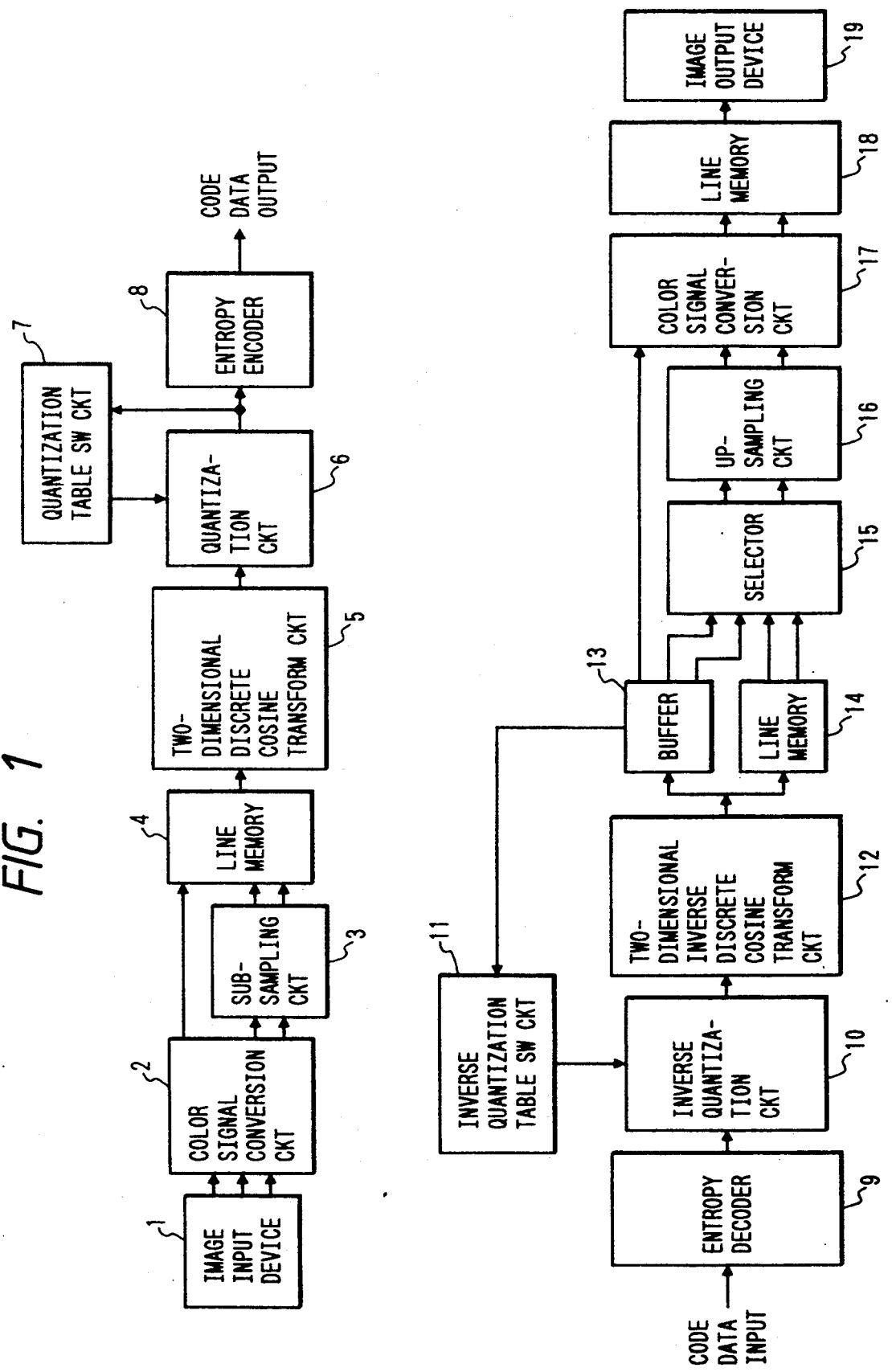
FIG. 1 is a block diagram showing an image coding apparatus of the present invention.

FIG. 1 is a block diagram of the present invention. While in the following description YCrCb is used as color space at the time of DC-AC conversion, the present invention is not limited to this and RGB, YIQ, YUV or L*a*b* may be used.

Denoted by numeral 1 is an image input device such as an image reader formed of CCD sensor, a host computer, a still video camera or a video camera; numeral 2 is a color signal (RGB-YCrCb) conversion circuit for converting color components; numeral 3 is a sub-sampling circuit for sub-sampling color difference signal; numeral 4 is a line memory for isolating a block consisting of a plurality of pixels; numeral 5 is a two-dimensional discrete cosine transform (DCT) circuit; numeral 6 is a quantization circuit for quantizing coefficient transformed into two-dimensional discrete cosine; numeral 7 is a quantization table switching circuit; and numeral 8 is an entropy encoder. Further, denoted by numeral 9 is an entropy decoder; numeral 10 is an inverse quantization circuit; numeral 11 is an inverse quantization table switching circuit; numeral 12 is a two-dimensional inverse discrete cosine transform circuit; numeral 13 is a buffer which retains two blocks of Y signal and one block each of CrCb signals; numeral 14 is a line memory for retaining CrCb signals which correspond to the lower one block line of a two-block line; numeral 15 is a selector for making a selection as to whether color difference signals are to be read from the buffer 13 or to be read from the line memory 14 depending on which one of the upper and lower block lines of the two block lines is being processed; numeral 16 is an up-sampling circuit for up-sampling the color difference signals; numeral 17 is a color signal (YCrCb-RGB) conversion circuit; numeral 18 is a line memory to be used for output; and numeral 19 is an image output device such as a laser beam printer, an ink-jet printer or a display device. Here the ink-jet printer includes a printer of the so-called "bubble-jet" type such as disclosed in U.S. Pat. No. 4,723,129. Also, it should be noted that one block line is constituted by arranging 8×8-pixel blocks into a line, i.e., corresponds to a line having a width of eight pixels.

Figure 15:
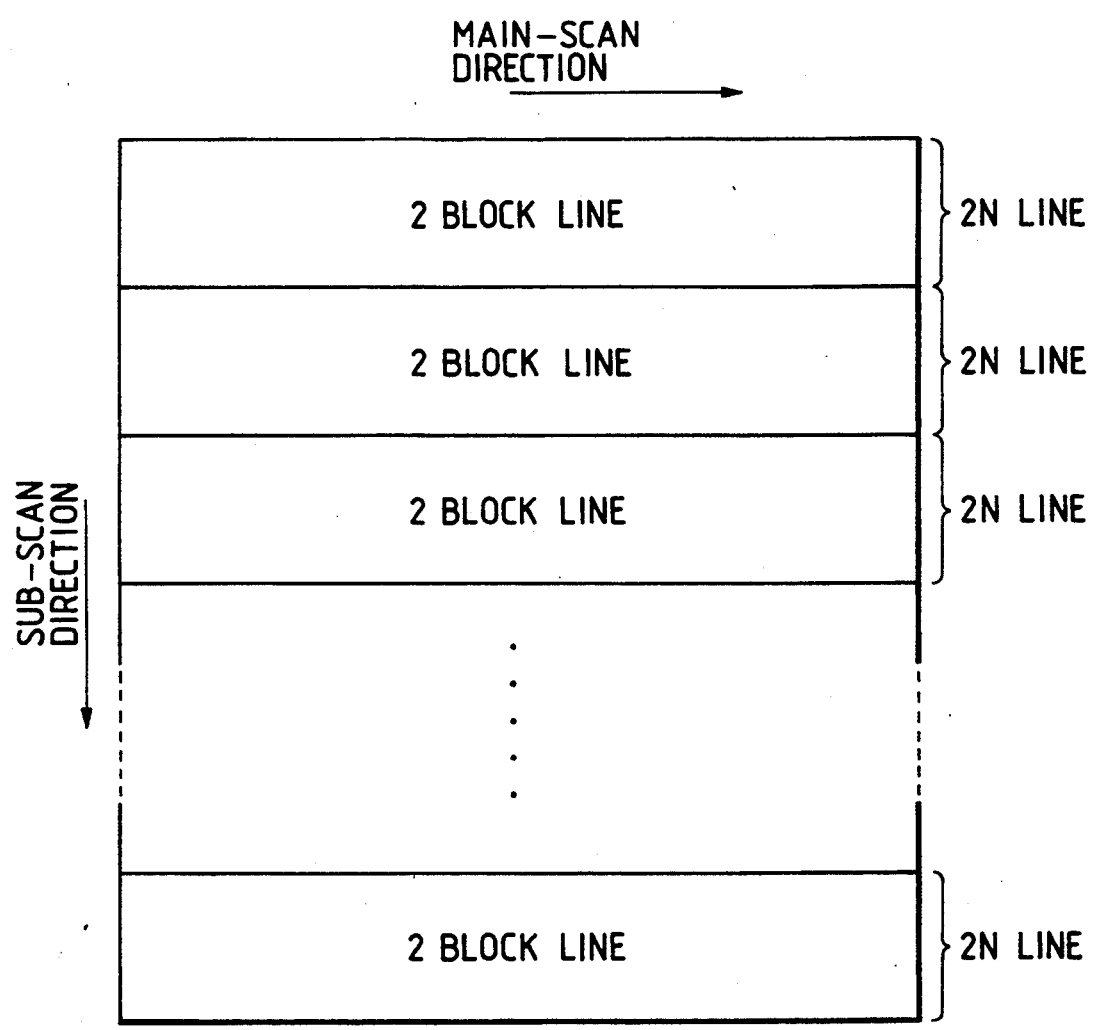
FIG. 15 illustrates the concept of block line.

Image data which is first inputted from the image input device 1 is serially subjected to RGB-YCrCb conversion, and at the same time color difference signals CrCb are sampled at a predetermined ratio for storage into the line memory 4. As shown in FIG. 15, this line memory is a memory capable of retaining data corresponding to two block lines for each color or a total of 6N (N refers to the length (in terms of pixels) of a side at the time of performing two-dimensional cosine transformation and, hereinafter, N=8 is supposed) lines.

While data read out from the line memory 4 is subjected to a two-dimensional discrete cosine transformation, the featuring point of the present invention lies in how to read the data from the line memory 4 and how to process it. To facilitate the following description, an image size of 48×48 pixels is supposed and two-dimensional discrete cosine transformation is performed on the basis of 8×8 pixels. Further, Y:Cr:Cb=4:1:1 is supposed as an example of sub-sampling ratio. That is, for the Cr, Cb components, one data is sampled for each 2×2-pixel block.

Figure 2:
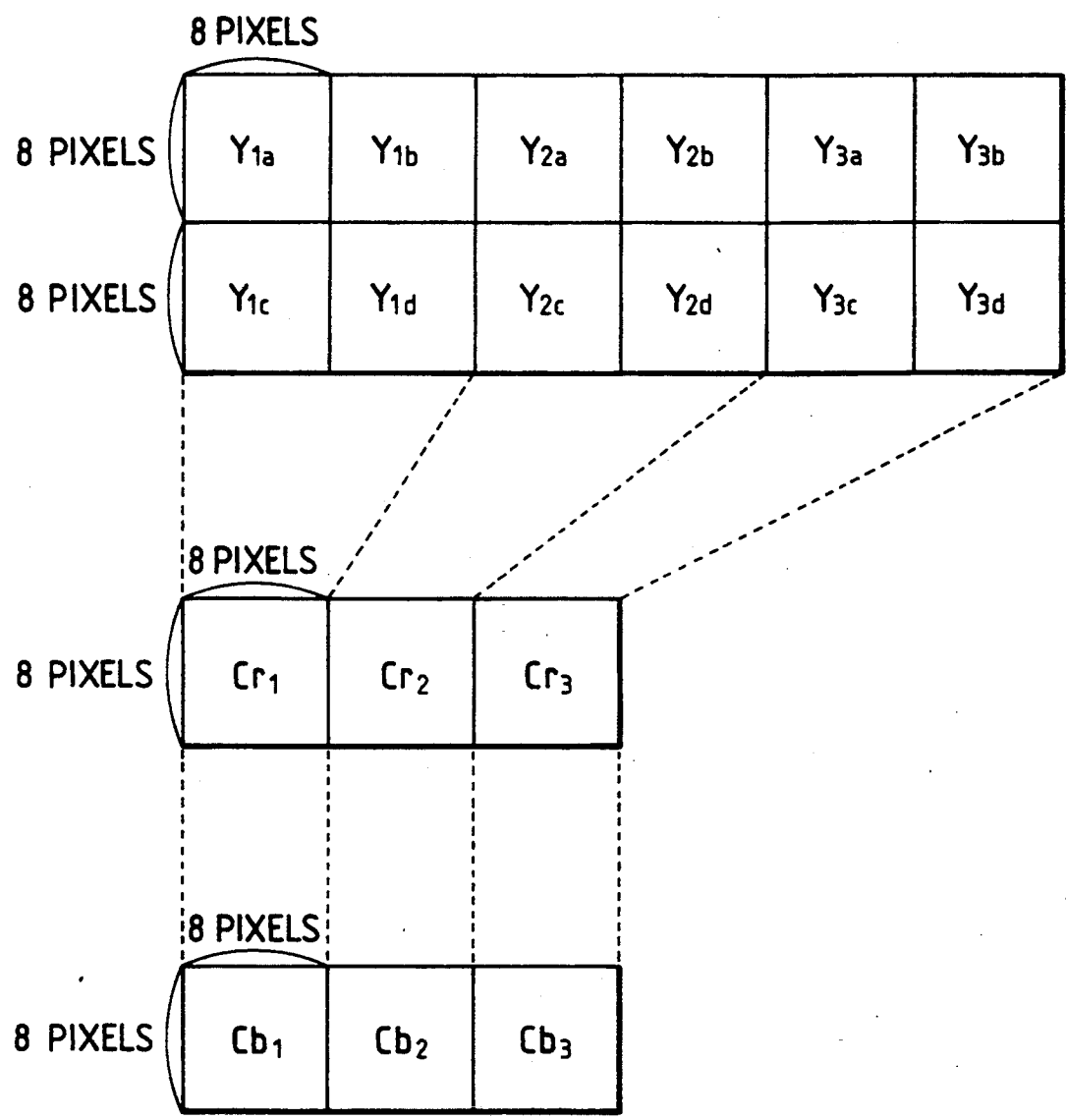
FIG. 2 illustrates the structure of data to be stored in a line memory 4.

Firstly, data (already subjected to RGB-YCrCb conversion, sub-sampling) for the first two block lines is stored in the line memory 4. Such data structure may be represented in a simple form as shown in FIG. 2. The color difference components corresponding to $Y_{1a}$, $Y_{1b}$, $Y_{1c}$, $Y_{1d}$ are indicated by $Cr_1, Cb_1$. Similarly, the color difference components corresponding to $Y_{2a}$, $Y_{2b}$, $Y_{2c}$, $Y_{2d}$ are indicated by $Cr_2, Cb_2$, and the color difference components corresponding to $Y_{3a}$, $Y_{3b}$, $Y_{3c}$, $Y_{3d}$ are indicated by $Cr_3, Cb_3$. The order by which they are transmitted to the two-dimensional discrete cosine transform unit 5 is: $Y_{1a}$, $Y_{1b}$, $Cr_1$, $Cb_1$, $Y_{2a}$, $Y_{2b}$, $Cr_2$, $Cb_2$, $Y_{3a}$, $Y_{3b}$, $Cr_3$, $Cb_3$, $Y_{1c}$, $Y_{1d}$, $Y_{2c}$, $Y_{2d}$, $Y_{3c}$, $Y_{3d}$. This may be generally stated as: $Y_{1a}$, $Y_{1b}$, $Cr_1$, $Cb_1$, $Y_{2a}$, $Y_{2b}$, $Cr_2$, $Cb_2$, ..., $Y_{sa}$, $Y_{sb}$, $Cr_s$, $Cb_s$, $Y_{1c}$, $Y_{1d}$, $Y_{2c}$, $Y_{2d}$, ..., $Y_{sc}$, $Y_{sd}$. That is, the order is as shown in FIG. 14. Provided that s=K/(2N) where K is the number of pixels in the main-scan direction of image. By performing two-dimensional discrete cosine transformation in the order as described above, it is possible at the decoder side to reduce output line memory. This will be described in detail at the time of explaining the decoder unit. It is supposed in the above that transmission is to be made by the order of $Y_{ia}$, $Y_{ib}$, $Cr_i$, $Cb_i$, (i=1, ..., s). However, since these four blocks are considered as a set, any order of blocks within a set is possible. For example, an order such as $Y_{ia}$,$Cr_i$,$Cb_i$,$Y_{ib}$, may also be used.

Processing as shown in Formula (5) below is performed in the two-dimensional discrete cosine transform circuit 5.

$$F(u, v) = \frac{1}{4} C(u)C(v) \sum_{i=0}^{7}\sum_{j=0}^{7} f(i,j)\cos[(2i + 1)u\pi/16] \quad (1)$$

$$\cos[(2j + 1)v\pi/16]$$

$$\begin{cases} C(u) = 1/\sqrt{2} \quad u = 0 \\ C(u) = 1 \quad u \neq 0 \\ C(v) = 1/\sqrt{2} \quad v = 0 \\ C(v) = 1 \quad v \neq 0 \end{cases}$$

Next, the coefficient value after two-dimensional discrete cosine transformation is linearly quantized. The quantization step size at this time is stored in the quantization table switching circuit 7. As shown in FIGS. 3A to 3C, quantization tables for Y data to be used for photograph (FIG. 3A), for Y data to be used for characters (FIG. 3B) and for CrCb data (FIG. 3C) are provided. For Y signal, a switching is made between the photograph-Y-data quantization table and the character-Y-data quantization table in accordance with a character/photograph judgment on the block which precedes the subject block. Also, for CrCb signals, a switching is made to CrCb data quantization table. An example of each quantization table is shown in FIGS. 3A to 3C.

Encoding of the quantized coefficient is performed in the entropy encoder 8, the result being transmitted as coded data.

The received coded data is then decoded by the entropy decoder 10, and an inverse quantization is performed at 11. Here, identical ones as the tables in the quantization table switching circuit 7 are provided in the inverse quantization switching circuit 11 as tables for inverse quantization. For Y signal, a switching is made between the photograph-Y-data quantization table and the character-Y-data quantization table. Also, for CrCb signals, a switching is made to the CrCb data quantization table. The inverse-quantized DCT coefficient is subjected to two-dimensional inverse discrete cosine transformation at 12, the result being stored in the buffer 13. Processing as shown below is performed at the two-dimensional inverse discrete cosine transform circuit 12:

$$f(i, j) = \frac{1}{4} \sum_{u=0}^{7}\sum_{v=0}^{7} C(u)C(v)F(u, v)\cos[(2i + 1)u\pi/16] \quad (2)$$

$$\cos[(2j + 1)v\pi/16]$$

where C(u), C(v) are defined as in Formula (1).

Figure 4:
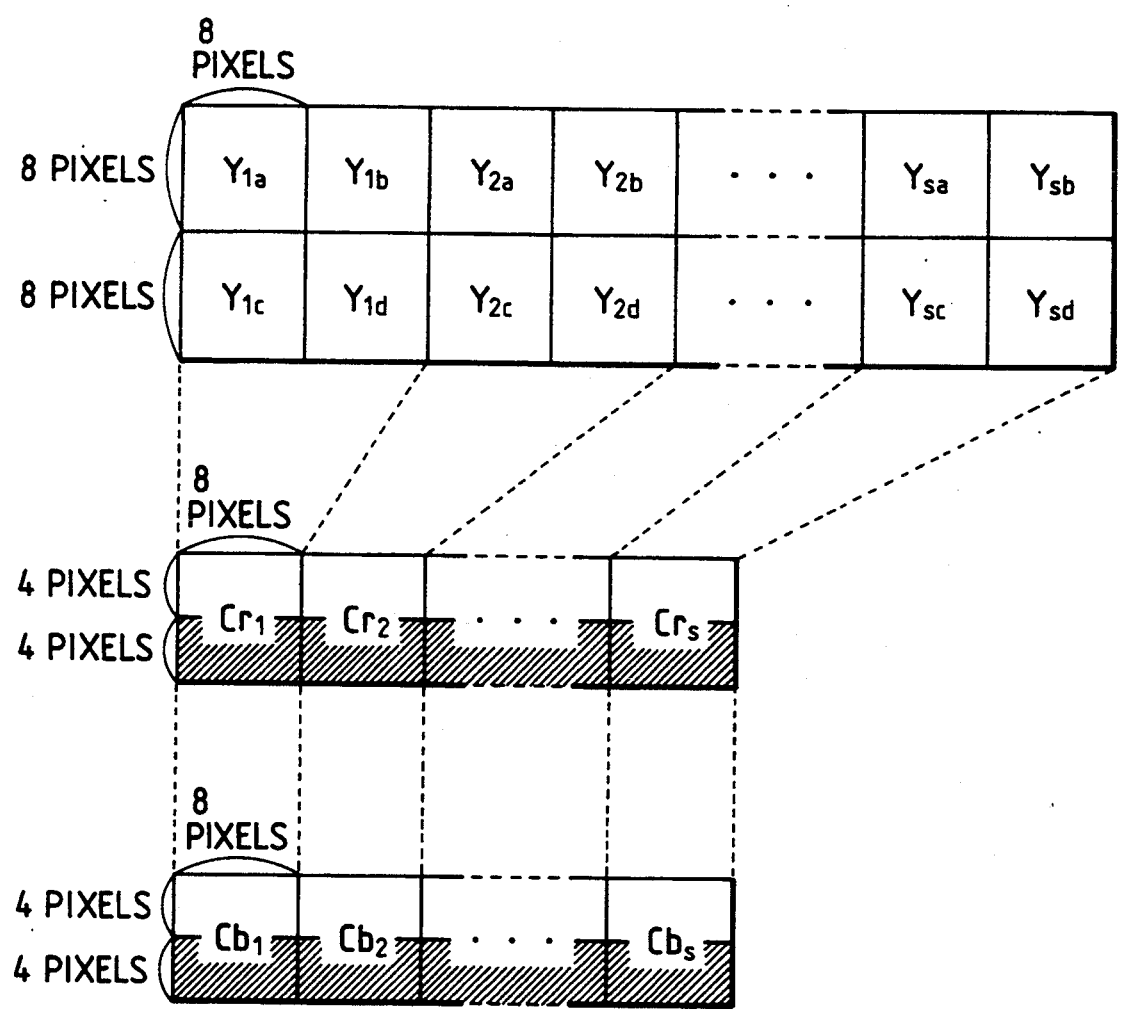
FIG. 4 shows data to be stored in a line memory 14.

Two blocks of Y signal and one block each of Cr, Cb signals may be stored in the buffer 13. At this time, data corresponding to the lower one block line of Cr, Cb signals is stored in the line memory 14. This will now be explained by way of FIG. 4.

Since two block lines are processed as a unit by dividing the image into portions each consisting of two block lines, a two-block line is taken as an example in the following description. Data to be sent first are $Y_{1a}$,$Y_{1b}$, $Cr_1$,$Cb_1$,$Y_{2a}$, $Y_{2b}$, $Cr_2$,$Cb_2$, ... ,$Y_{sa}$, $Y_{sb}$,$Cr_s$,$Cb_s$. To transform the portion corresponding to $Y_{1a}$, $Y_{1b}$ into RGB data, the respective upper half of $Cr_1$,$Cb_1$, i.e., data of 8×4 for each is necessary. The remaining lower half is necessary to convert the portion corresponding to $Y_{1c}$, $Y_{1d}$ of the lower one block line into RGB data. Thus, the respective lower half of Cr, Cb (the portion indicated by slant lines in FIG. 4) is retained in the line memory. When $Y_{1c}$, $Y_{1d}$, $Y_{2c}$, $Y_{2d}$, ..., $Y_{sc}$, $Y_{sd}$ corresponding to the lower one block line are transmitted, conversion into RGB data is possible by using necessary Cr,Cb data which are read from the line memory. The number of line memories in this case for performing the above described processing is four (N/2).

Numeral 15 denotes a selector. This outputs the input from the buffer 13 when the upper one block line of the two block lines is processed and outputs the input from the line memory 14 at the time of processing the lower one block line. Numeral 16 denotes an up-sampling circuit for interpolating the color difference data provided from the selector 15. Numeral 17 denotes a color signal (YCrCb-RGB) conversion circuit for converting YCrCb data into RGB data. Numeral 18 denotes an output line memory. The RGB data provided from the YCrCb-RGB conversion unit 17 is once buffered here and is outputted by rasters as a decoded image.

Figure 5:
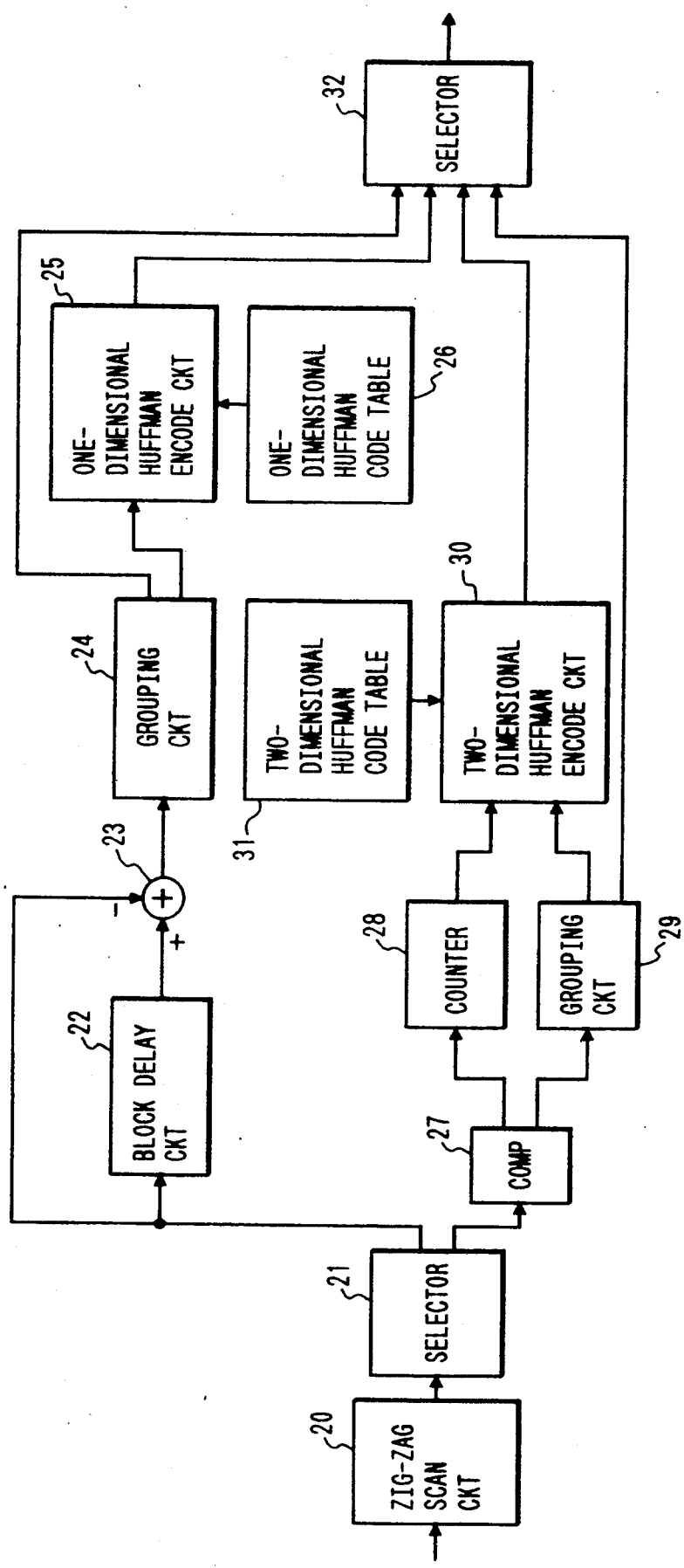
FIG. 5 is a block diagram of an entropy encoder 8.

FIG. 5 is a block diagram of the entropy encoder 8.

Denoted by numeral 20 is a zigzag scan circuit; numeral 21 is a selector; numeral 22 is a block delay circuit; numeral 23 is an adder; numeral 24 is a grouping circuit; numeral 25 is a one-dimensional Huffman encoding circuit; numeral 26 is a one-dimensional Huffman code table; numeral 27 is a comparator; numeral 28 is a counter; numeral 29 is a grouping circuit; numeral 30 is a two-dimensional Huffman encoding circuit; numeral 31 is a Huffman code table, and numeral 32 is a selector.

Figure 7:
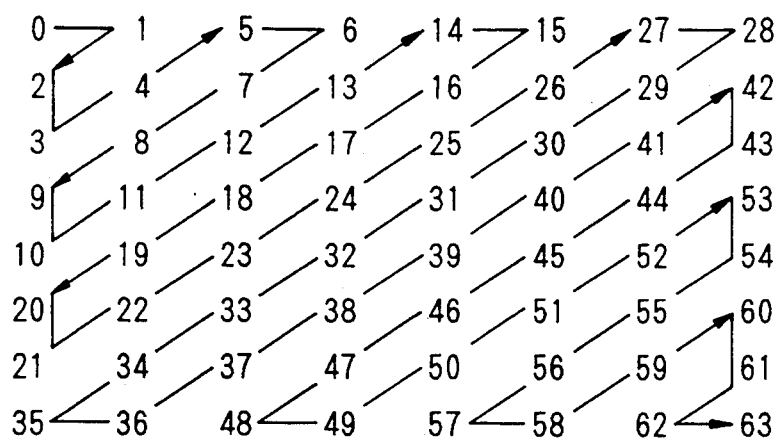
FIG. 7 illustrates the order of zigzag scan.
Figure 11:
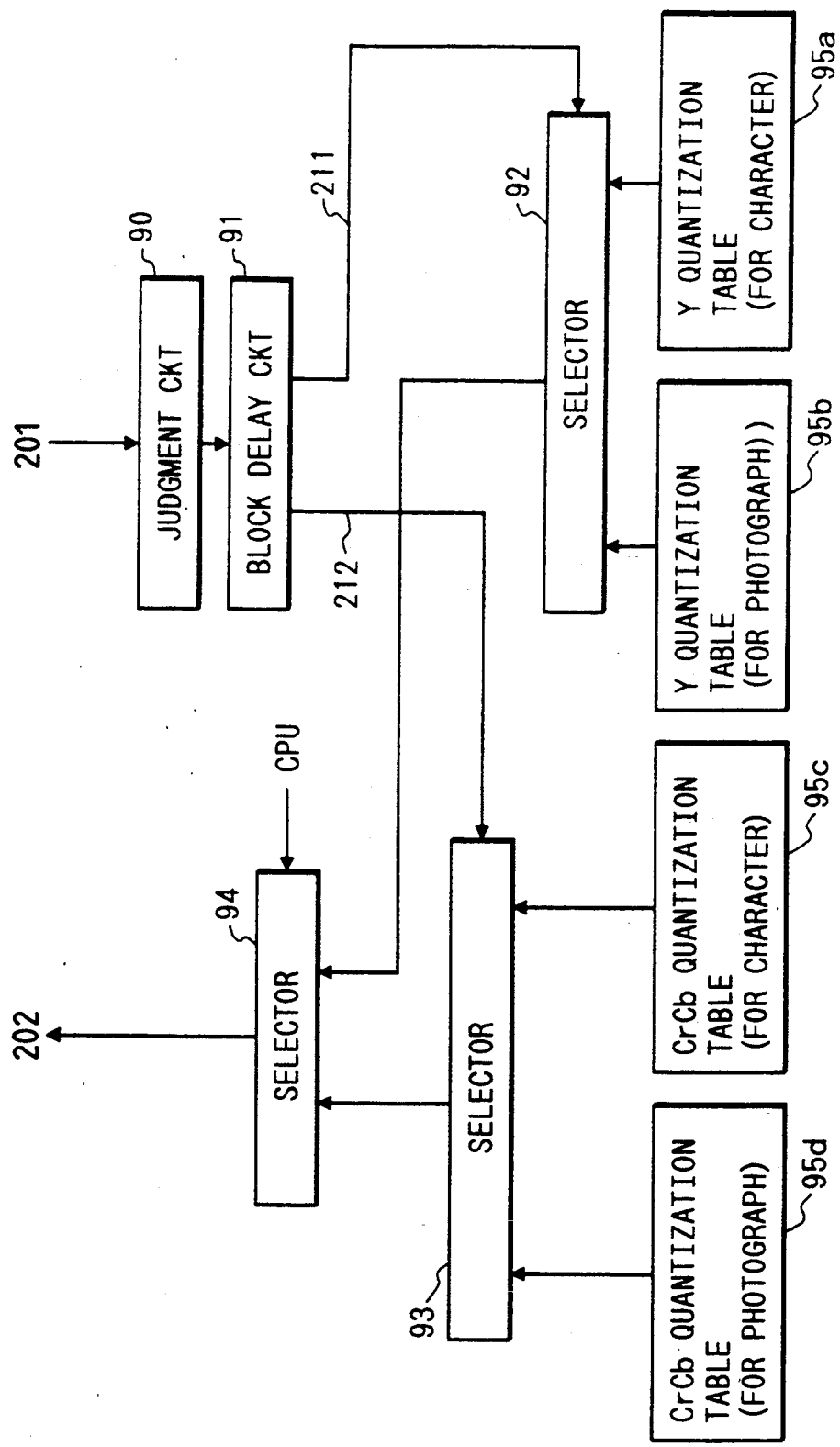
FIG. 11 is a block diagram of an inverse quantization table switching circuit of Embodiment 2.

First, the coefficient series that has been transmitted to the zigzag scan circuit 20 is converted in the order as shown in FIG. 7. The coefficient is then divided into direct current (DC) component and alternating current (AC) component at the selector 21, and the DC component is fed into the block delay circuit 22. Here DC components of the directly preceding blocks respectively of YCrCb are retained, and a differential operation of the corresponding components is performed at the adder 2 with respect to the DC components of the previous block. The result after taking the difference is input to the grouping circuit 24 where it is classified into groups as shown in FIG. 11 and, at the same time of outputting the group number, additional bit as shown in Table 2 is also outputted. In the one-dimensional Huffman encoding circuit, such group number is encoded into Huffman code. Further, if the coefficient is an AC coefficient at the selector 21, such coefficient is input to the comparator 27. It is seen at the comparator 27 if the input AC coefficient is "0", and, when it is "0", the length of 0-run is counted in the counter 28. When it is not "0", the effective coefficient value is classified as shown in FIG. 18 at the grouping circuit 29, and the group number and the additional bits as shown in FIG. 17 are outputted. The output group number and the run length of 0-run is encoded into Huffman code at the two-dimensional Huffman encoding circuit 30. The signal provided from the one-dimensional Huffman encoding circuit 25, the additional bit signal output from the grouping circuit 24, the signal provided from the two-dimensional Huffman encoding circuit 30, and the additional bit signal output from the grouping circuit 29 are sent out at the selector 32 as encoded data in a predetermined order.

Figure 6:
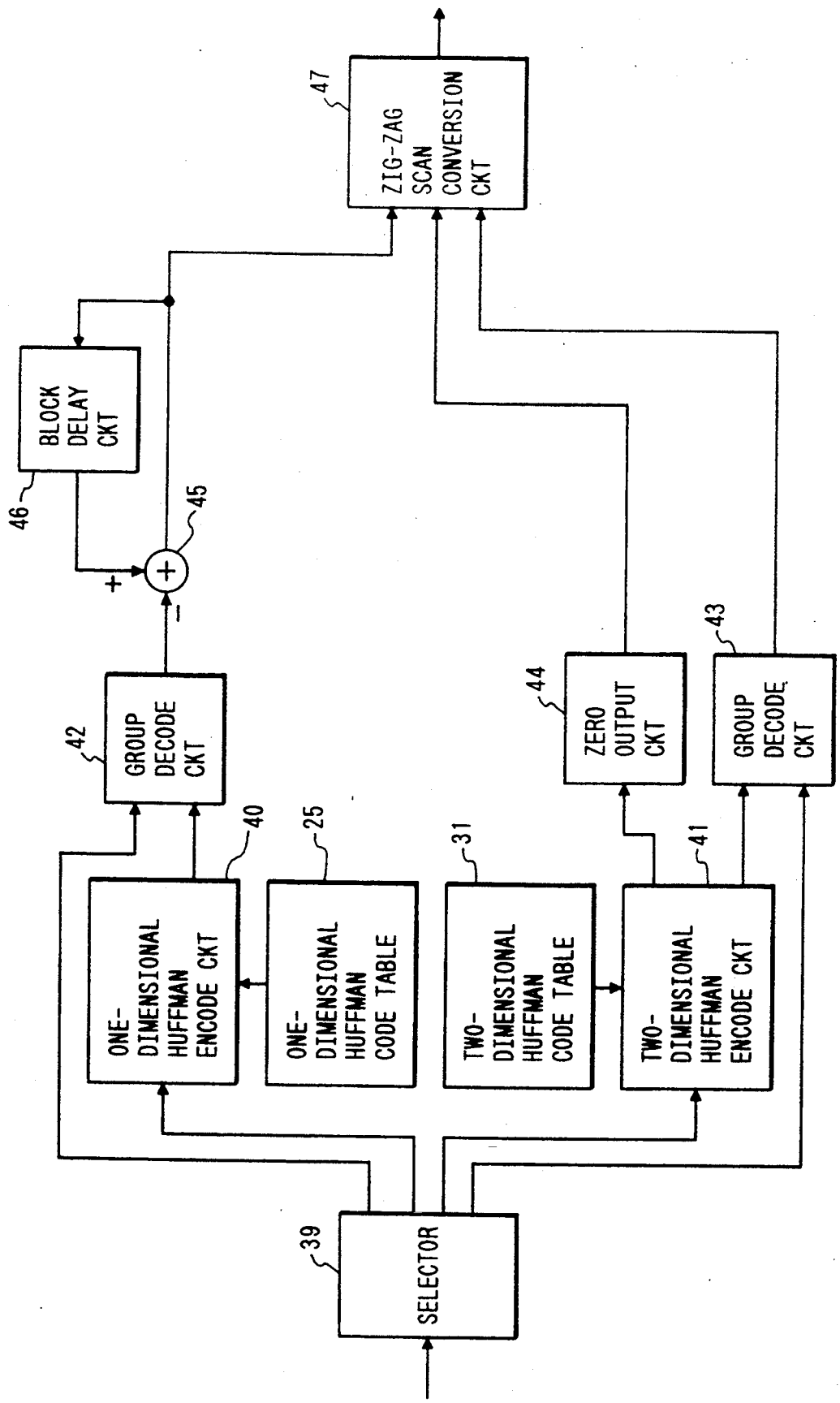
FIG. 6 is a block diagram of an entropy decoder 10.

FIG. 6 is a block diagram of an entropy decoder 10. Denoted by numeral 39 is a selector, numeral 40 is a one-dimensional Huffman decoding circuit; numeral 41 is a two-dimensional Huffman decoding circuit; numerals 42, 43 are each a group decode circuit; numeral 44 is a zero output circuit; numeral 45 is an adder; numeral 46 is a block delay circuit; and numeral 47 is a zigzag scan conversion circuit.

First, the coded data being sent in a predetermined order are respectively input to corresponding circuits by the selector 39. That is, the signal provided from the one-dimensional Huffman coding circuit 15 enters the one-dimensional Huffman decoding circuit 40; the additional bit signal output from the grouping circuit 24 enters the group decode circuit 42; the signal provided from the two-dimensional Huffman encoding circuit 30 enters the two-dimensional Huffman decoding circuit 41; and the additional bit signal output from the grouping circuit 29 enters the group decoding circuit 43. The signal input to the one-dimensional Huffman decoding circuit 40 is combined and enters the group decode circuit 42. Here the differential value of DC coefficient is decoded by the input additional bit signal and the decoded group number signal. The difference of the DC coefficient value of the previous block provided from the block delay circuit 46 is then taken to decode the proper DC coefficient value. In the two-dimensional Huffman decoding circuit 41, the input signal is decoded. Of the signals decoded at the two-dimensional Huffman decoding circuit 41, the signal indicating the run length of 0-run enters the zero output circuit 44, whereby the count value "0" corresponding to its signal value enters the zigzag scan conversion circuit 47. Also, of the signals combined at the two-dimensional Huffman decoding circuit 41, the signal indicating the group number of AC coefficient enters the group decode circuit 43. A proper AC coefficient value is decoded by the input additional bit signal and the decoded group number signal, the result being input to the zigzag scan conversion circuit 47. At the zigzag scan conversion circuit 47, the input data is arranged in a predetermined order to be outputted.

Figure 8:
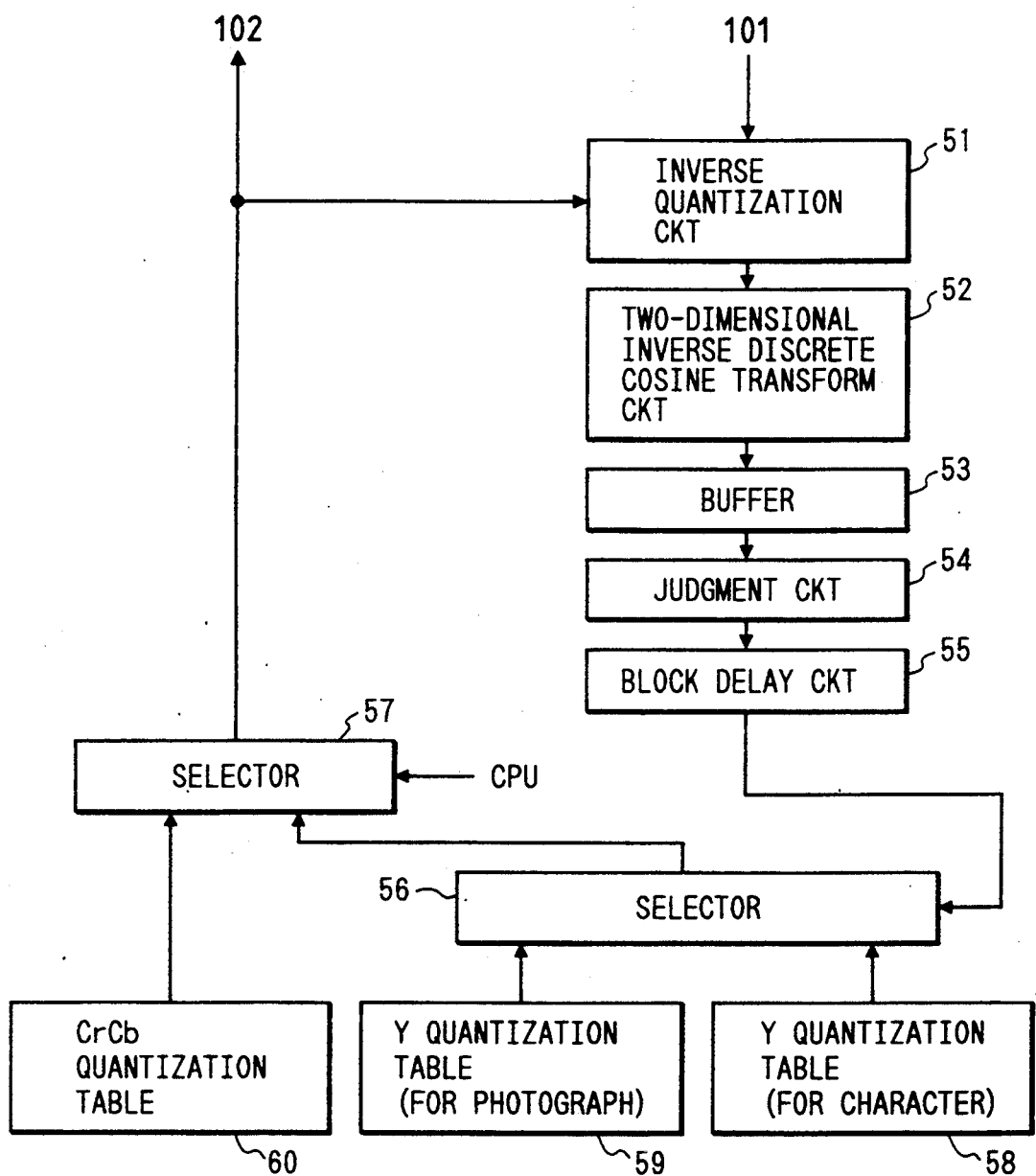
FIG. 8 is a block diagram of a quantization table switching circuit 7.

FIG. 8 is a block diagram of the quantization table switching circuit 7.

Y signal 101 provided from the quantization circuit 6 enters an inverse quantization circuit 51 where the inverse quantization of DCT coefficient is performed. The inverse quantization table to be used at this time is the same as that at the time of quantizing DCT coefficient. The inverse-quantized signal is decoded at a two-dimensional inverse discrete cosine transform circuit 52 and is retained at a buffer 53. Thus, N×N pixels of Y data exist in the buffer 53. A character/photograph judgment with respect to the image data stored in the buffer 53 is made at a judgment circuit 54, the result of which will be input to a block delay circuit 55. Character/photograph judging method utilized here is a method in which a block is considered as a character region when an edge exists within that block while it is considered as a photograph region if no edge exists. System using the Laplacian or method in which existence of an edge is assumed when the difference between a maximum value and a minimum value within the block exceeds a certain value (for example 50) may be used as the method for detecting an edge. While the latter is used in the present invention, it is not limited to the above described judging methods and a system capable of character/photograph judgment may be used. At the block delay circuit 55, it is delayed until quantization of the next Y signal is started at the quantization circuit 6. Switching signal for Y signal quantization tables is then provided to a selector 56. Based on this switching signal, a signal from a character-Y quantization table 58 is provided to a selector 57 when the switching signal is of character while, if it is of photograph, a signal from a photograph-Y quantization table 59 is provided to the selector 57. Switching between the signal from a CrCb signal quantization table 60 and the signal from the selector 56 is made at the selector 57 based on a switching signal from a CPU (not shown).

As described above, at the quantization table switching circuit, the Y (luminance) signal once subjected to two-dimensional discrete cosine transformation and quantized is decoded to the original Y (luminance) signal. A character/photograph judgment is made on the basis of the decoded Y (luminance) signal and the result of which will be a feedback to Y (luminance) signal quantization for the next block. That is, switching of quantization tables at the time of Y (luminance) signal quantization for the next block is performed. In this way, quantization in accordance with local characteristic of an image may be performed to improve the image quality. In addition, by performing a similar operation as that described above, it is possible at the inverse quantization switching circuit 11 on the decoding side to switch quantization tables in synchronism with the coding side. Thus, the coded data may properly be decoded.

Figure 9:
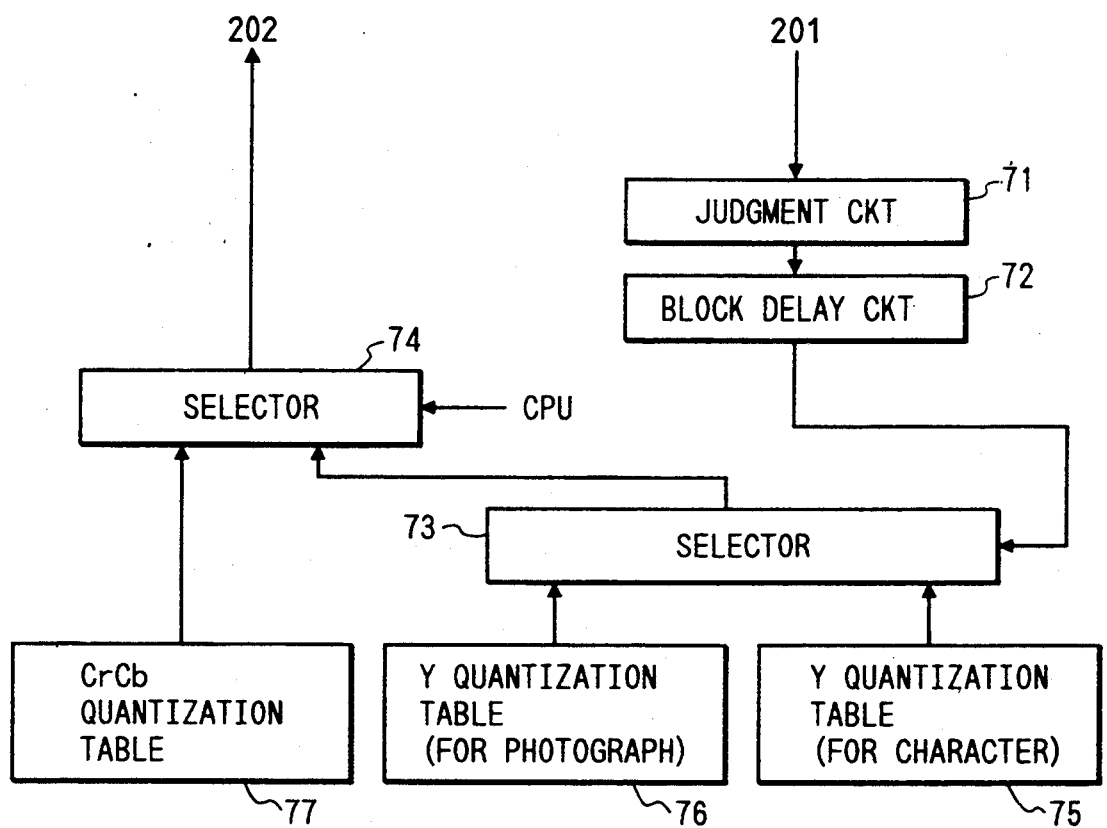
FIG. 9 is a block diagram of an inverse quantization table switching circuit 11.

FIG. 9 shows a block diagram of the inverse quantization table switching circuit 11. Denoted by numeral 71 is a judgment circuit; numeral 72 is a block delay circuit; numerals 73, 74 are selectors, respectively; numeral 75 is a character-Y quantization table; numeral 76 is a photograph-Y quantization table; and numeral 77 is a CrCb signal quantization table. Composition and operation of these circuits are respectively identical to those of judgment circuit 54, block delay circuit 55, selectors 56, 57, character-Y quantization table 58, photograph-Y quantization table 59, and CrCb signal quantization table 60.

It should be noted that, instead of the above-described sampling circuit, a circuit for calculating a representative value such as the mean value of a plurality of pixels may be provided.

Embodiment 2

While only the quantization table for Y is switched at the quantization table switching circuit 7 and the inverse quantization table switching circuit 11 of the above described embodiment, quantization table for CrCb may, in addition, also be switched.

Figure 10:
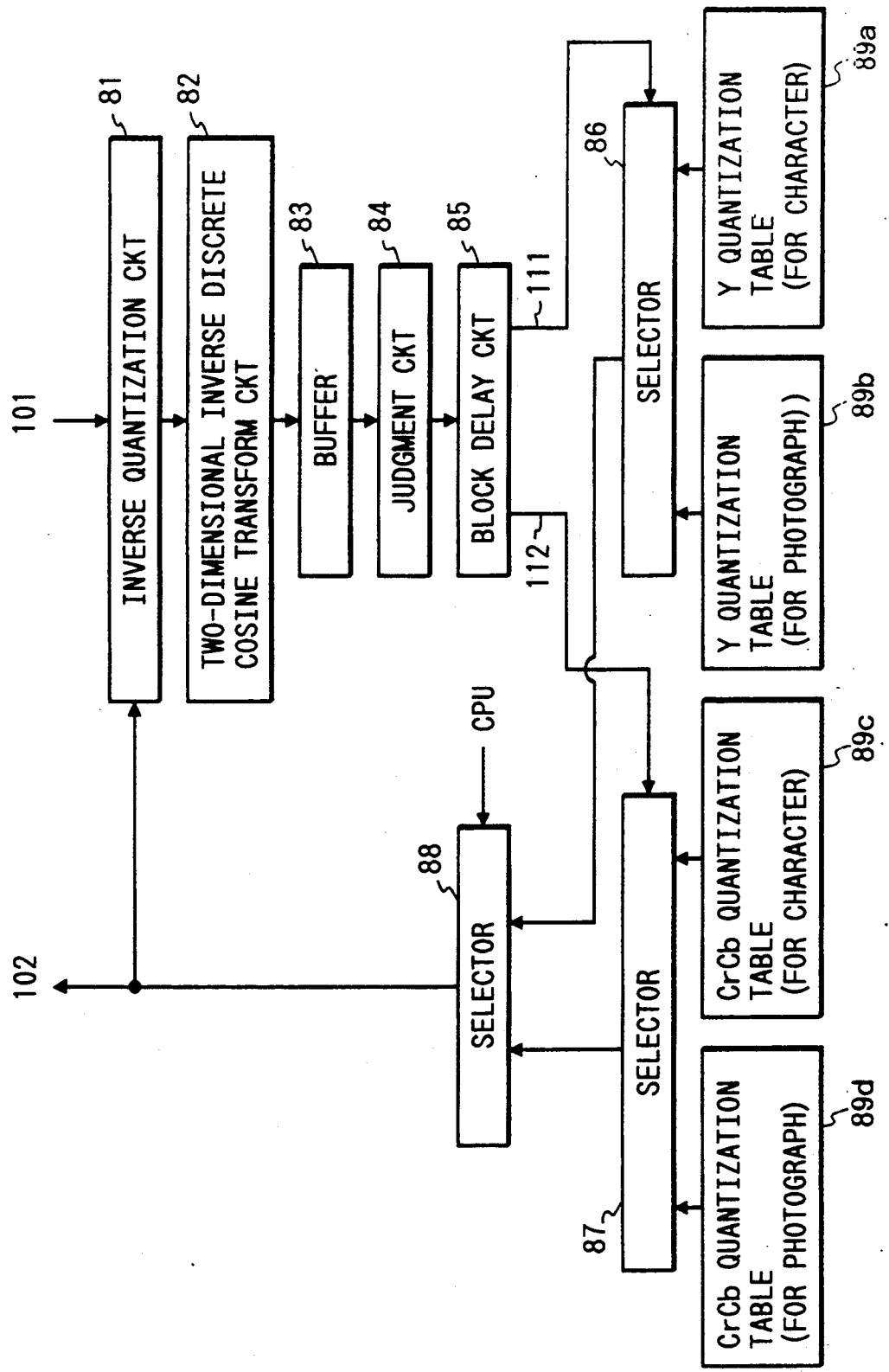
FIG. 10 is a block diagram of a quantization table switching circuit of Embodiment 2.

FIG. 10 is a block diagram of a quantization table switching circuit.

A case will now be considered in which Y signal is provided as a signal 101 from the quantization circuit 6. This signal enters the inverse quantization circuit 81 where an inverse quantization of DCT coefficient is performed. The inverse quantization table to be used at this time is the same as that at the time of quantizing the DCT coefficient. The inverse-quantized signal is decoded at a two-dimensional inverse discrete cosine transform circuit 82 and is retained at a buffer 83. Thus, N×N pixels of Y data exist in the buffer 83. A character/photograph judgment with respect to the image data stored in the buffer 83 is made at a judgment circuit 84, the result of which will be input to a block delay circuit 85. Character/photograph judging method utilized here is a method in which a block is considered as a character region when an edge exists within that block while it is considered as a photograph region if no edge exists. System using Laplacian or method in which existence of an edge is assumed when the difference between a maximum value and a minimum value within the block exceeds a certain value (for example 50) may be used as the method for detecting an edge. While the latter is used in the present invention, it is not limited to the above described judging methods and any system capable of character/photograph judgment may be used. At the block delay circuit 85, a delay is made until quantization of the next Y signal is started at the quantization circuit 6. Switching signal 111 for Y signal quantization tables is then provided to a selector 86. Based on this switching signal 111, a signal from a character-Y quantization table 89a is provided to a selector 88 when the switching signal is of character while, if it is of photograph, a signal from a photograph-Y quantization table 89b is provided to the selector 88.

A case will now be considered in which the signal 101 is of Cr. This signal enters the inverse quantization circuit 81 where an inverse quantization of DCT coefficient is performed. The inverse quantization table to be used at this time is the same as that at the time of quantizing the DCT coefficient. The inverse-quantized signal is decoded at the two-dimensional inverse discrete cosine transform circuit 82 and is retained at the buffer 83. Thus, N×N pixels of Cr data exist in the buffer 83. A character/photograph judgment with respect to the image data stored in the buffer 83 is made at a judgment circuit 84, the result of which will be input to the block delay circuit 85. At the block delay circuit 85, a delay is made until quantization of the next Cr signal is started at the quantization circuit 6. Switching signal 112 for CrCb signal quantization tables is then provided to a selector 87. Based on this switching signal 112, a signal from a character CrCb signal quantization table 89c is provided to the selector 88 when the switching signal is of character while, if it is of photograph, a signal from a photograph CrCb signal quantization table 89d is provided to the selector 88.

Switching between the signal from the selector 86 and the signal from the selector 87 is made at the selector 88 based on a switching signal from a CPU (not shown).

FIG. 11 is a block diagram of an inverse quantization table switching circuit. Denoted by numeral 90 is a judgment circuit; numeral 91 is a block delay circuit; numerals 92, 93, 94 are selectors, respectively; numeral 95a is a character-Y quantization table; numeral 95b is a photograph-Y quantization table; numeral 95c is a character-CrCb signal quantization table; and numeral 95d is a photograph-CrCb signal quantization table. Composition and operation of these circuits are respectively identical to those of judgment circuit 84, block delay circuit 85, selectors 86,87,88, character-Y quantization table 89a, photograph-Y quantization table 89b, character-CrCb signal quantization table 89c, and photograph-CrCb signal quantization table 89d.

An example of the quantization tables used here is shown in FIGS. 12A to 12D. FIGS. 12A, 12B, 12C and 12D show tables 95b, 95a, 95d and 95c, respectively.

Embodiment 3

The present invention may also be used in an image filing device. In such a case, code data output and code data input as shown in FIG. 1 may be connected to an image filing device having a storage such as magneto-optic disk.

Since, according to the embodiments of the present invention, quantization table may adaptively be changed as described above by judging the attribute of the preceding block, encoding is possible of an image with image quality higher than that conventionally provided.

It should be noted that, while in the above described embodiments table selection is used as the method of determining quantization step, a feedback loop for example may be provided so as to obtain a quantization step which results in a predetermined code length. In such a case, a method may be used where the number of feedbacks is changed between luminance signal and color signal or where no feedback is provided with respect to color signal.

According to the present invention, it is possible as described above to perform an efficient encoding while maintaining image quality.

Embodiment 4

The above described Embodiment 1 of the present invention assumes, in an image processing apparatus using orthogonal transformation coding, K as the number of pixels in the main-scan direction and N as the length of a side of a block for orthogonal transformation, and the image is supposedly divided into bands (2-block line).

When sampling color components at a ratio of 4:1:1, two blocks of luminance (Y) signal in the upper one block line and one block each of corresponding color (Cr,Cb) components are combined and are transmitted in K/(2N) sets, and Y component in the remaining lower one block line is transmitted in K/N blocks. Coding is effected by subjecting all the 2-block lines of the image to the above described processing.

That is, as shown in FIG. 14:

1) two blocks of Y component and one block each of corresponding Cr,Cb components are combined and are sent in K/(2N) sets; and 2) the remaining Y component is sent in K/N blocks.

Transmission of code data is performed by repeating the above described 1), 2) for every 2-block line. Here a 2-block line refers to what is obtained by dividing each image into bands of 2N lines as shown in FIG. 15.

At the decoding side, data corresponding to N line may be decoded by the data transmitted by the above 1). At this time, the number of line memories necessary for retaining the decoded data is 3N (N line for each of R, G, B). Further, of the Cr,Cb data transmitted by 1), the portion corresponding to data transmitted by 2) (N/2 of line memories are necessary to retain this) is retained so that data corresponding to the next N line may be decoded by adding the data of 2).

Therefore, for decoding in the present invention, provision of (7N)/2 line memories will suffice. If N=8, 6N-(7N)/2=48−28=20 of line memories will be saved.

As described above, according to the present invention, transmitting form is separated into a mode in which color signals are transmitted during the transmission of luminance signal corresponding to one line and another mode in which transmission of luminance signal corresponding to one line is consecutively performed. Thus the amount of data for luminance component Y to be stored in the buffer memory 13 at the decoding will correspond to one block line (=8 lines). It is possible to reduce memory capacity to simplify circuit structure.

That is, by merely changing the order of data to be transmitted at the encoder side, the number of line memories for output at the decoder side may be reduced to one half of what is conventionally needed.

Embodiment 5

While a description has been given with respect to Embodiment 4 by supposing of a sampling of 4:1:1, the circuitry may be further simplified if 4:2:2 is used. This will be explained in the following.

Since the circuit structure is almost the same as in Embodiment 4, only the different point will be described.

1) Sampling is performed at the sub-sampling unit so that a sampling ratio of Y:Cr:Cb=4:2:2 will be obtained.

Figure 19:
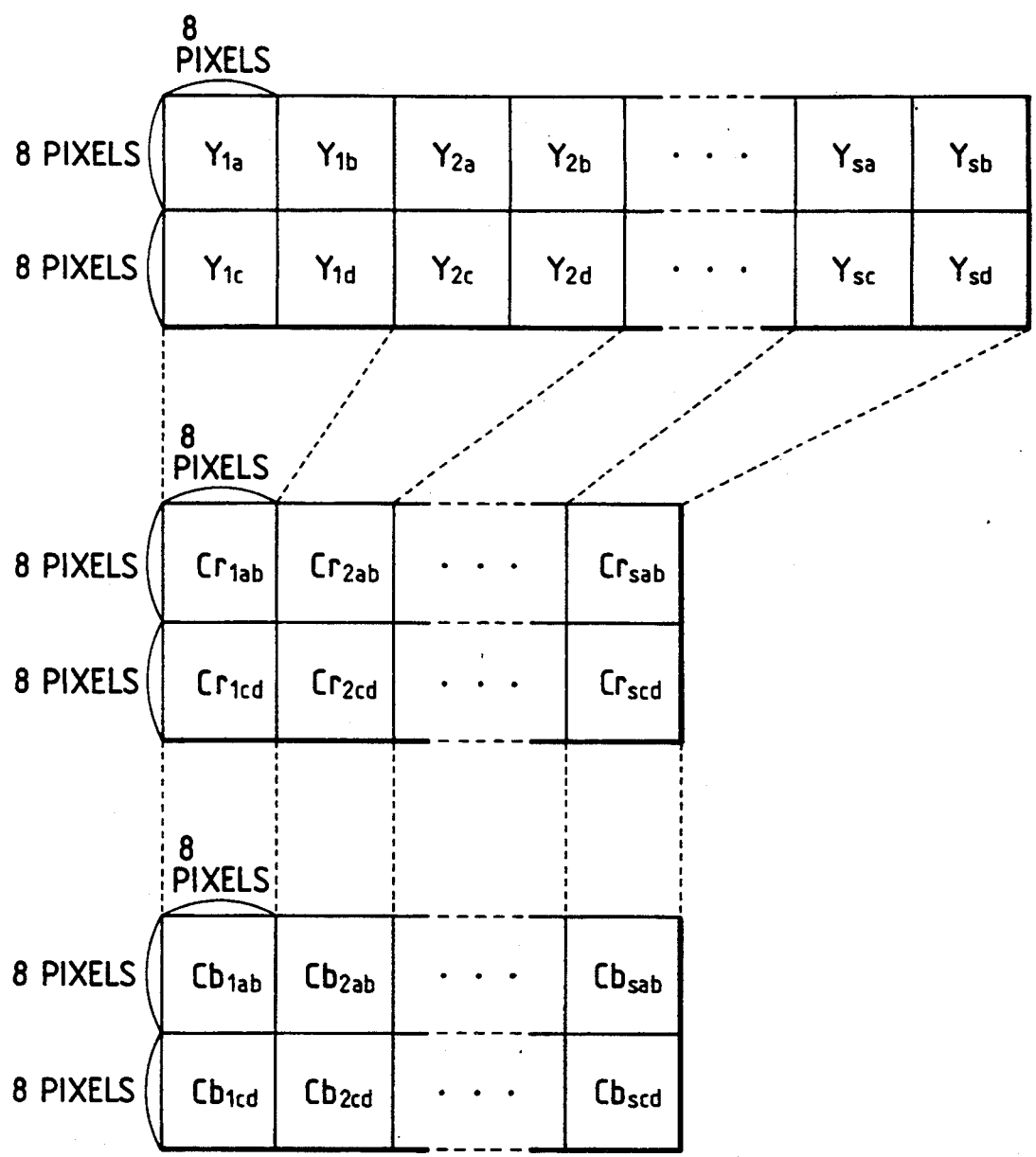
FIG. 19 illustrates the structure of data to be stored in the line memory 4 of Embodiment 5.

2) Data structure to be stored in the line memory 4 is as shown in FIG. 19, data order sent therefrom being: $Y_{1a}, Y_{1b}, Cr_{1ab}, Cb_{1ab}, Y_{2a}, Y_{2b}, Cr_{2ab}, Cb_{2ab}, \ldots, Y_{sa}, Y_{sb}, Cr_{sab}, Cb_{sab}, Y_{1c}, Y_{1d}, Cr_{1cd}, Cb_{1cd}, Y_{2c}, Y_{2d}, Cr_{2cd}, Cb_{2cd}, \ldots, Y_{sc}, Y_{sd}, Cr_{scd}, Cb_{scd}$. Provided that color difference data corresponding to luminance data $Y_{ia}, Y_{ib}$ are $Cr_{iab}, Cb_{iab}$, and color difference data corresponding to luminance data $Y_{ic}, Y_{id}$ are $Cr_{icd}, Cb_{icd}$. Here $i=1, \ldots, s$, $s=K/2$ are supposed (K refers to the number of N×N-pixel blocks in the main-scan direction).

3) At the decoding side, since $Y_{ia}, Y_{ib}, Cr_{iab}, Cb_{iab}$ and $Y_{ic}, Y_{id}, Cr_{icd}, Cb_{icd}$ are sent respectively in a combined form, needed data may be provided by only the buffer memory 13 as shown in FIG. 1 making the line memory 14 unnecessary.

Thus, when sub-sampling is performed at a ratio of 4:2:2, the line memory becomes unnecessary and the circuitry is simplified even more than that in Embodiment 4.

Embodiment 6

The present invention may also be used in an image filing device. In such a case, code data output and code data input as shown in FIG. 1 may be connected to an image filing device such as magneto-optic disk.

Embodiment 7

While in Embodiment 4 color signals are transmitted during the transmission of luminance signal corresponding to one line, it is also possible as in the present embodiment to transmit color signals corresponding to one line after transmitting luminance signal corresponding to one line and then to transmit luminance signal corresponding to one more line.

That is, in FIG. 2, the transmitting order of the blocks is made to: $Y_{1a}, Y_{1b}, Y_{2a}, Y_{2b}, Y_{3a}, Y_{3b}, Cr_1, Cr_2, Cr_3, Cb_1, Cb_2, Cb_3, Y_{1c}, Y_{1d}, Y_{2c}, Y_{2d}, Y_{3c}, Y_{3d}$.

For color signals, the order of $Cr_1, Cb_1, Cr_2, Cb_2, Cr_3, Cb_3$ is also possible.

Embodiment 8

While in Embodiment 4 a line having luminance signal and color signals mixed therein is transmitted first, it is also possible as in the present embodiment to transmit a line having luminance signal and color signal mixed therein after transmitting consecutively luminance signal corresponding to one line.

That is, in FIG. 2, the transmitting order of the blocks is made to: $Y_{1a}, Y_{1b}, Y_{2a}, Y_{2b}, Y_{3a}, Y_{3b}, Y_{1c}, Y_{1d}, Cr_1, Cb_1, Y_{2c}, Y_{2d}, Cr_2, Cb_2, Y_{3c}, Y_{3d}, Cr_3, Cb_3$.

Using such transmitting order, while an advantage as in Embodiment 4 is not obtained at the decoding side, the amount of memory of the buffer memory 9 for storing coded data to be transmitted is reduced at the encoding side with respect to luminance component by the amount corresponding to one block line (eight lines).

As described above, according to the present invention, it is possible to achieve an efficient transmission of image data and a simplification of circuit structure.

The present invention is not limited to the above described embodiments and various modifications and applications will be possible within the scope of appended claims.

What is claimed is:

1. An image processing apparatus comprising:
   generation means for generating luminance information and color information for each pixel;
   division means for dividing the luminance information and the color information into blocks each having a plurality of pixels;
   first quantization means for quantizing the luminance information in units of blocks, using a first quantization step;
   first control means for determining the first quantization step based on a plurality of quantization matrices;
   second quantization means for quantizing the color information in units of blocks, using a second quantization step; and
   second control means for determining the second quantization step based on a single quantization matrix.

2. An image processing apparatus according to claim 1, wherein the luminance information and the color information are respectively information converted into frequency components by means of an orthogonal transformation.

3. An image processing apparatus according to claim 1, further comprising encoder means for encoding luminance information and color information quantized by said first and second quantization means, respectively.

4. An image processing apparatus according to claim 1, wherein the first quantization step is determined for a particular block in accordance with an image type of that block, and wherein the second quantization is determined irrespective of the image type of that block.

5. An image processing apparatus according to claim 4, wherein the image type of the block is discriminated using data already encoded.

6. An image processing apparatus according to claim 4, wherein the image type of the block is discriminated using luminance data already encoded.

7. A method for processing an image comprising the steps of:
generating luminance information and color information for each pixel;
dividing the luminance information and the color information into blocks, each having a plurality of pixels; and
quantizing the luminance information using a first quantization step and the color information using a second quantization step,
wherein the first quantization step is determined for a particular block in accordance with an image type of that block the second quantization step is determined irrespective of the image type of the block.

8. A method according to claim 7, wherein the luminance information and the color information are respectively information converted into frequency components by means of an orthogonal transformation.

9. A method according to claim 7, further comprising the step of encoding luminance information and color information quantized in said quantization step.

10. A method according to claim 7, wherein the image type of the block is discriminated using data already encoded.

11. A method according to claim 7, wherein the image type of the block is discriminated using luminance data already encoded.

12. An image processing apparatus comprising:
generation means for generating luminance information and color information representing a color image;
encoding means for encoding the luminance information and the color information in units of blocks each consisting of a plurality of pixels; and
output means for outputting encoded luminance information and encoded color information,
wherein said output means has a first output mode, in which encoded color information of a block is output prior to encoded luminance information corresponding to the block, and a second output mode, in which encoded color information for a block is output after encoded luminance information for the block.

13. An image processing apparatus according to claim 12, wherein said encoding means includes conversion means for performing orthogonal transformation.

14. An image processing apparatus according to claim 13, wherein a color space used at the time of performing said orthogonal transformation is selected from the group consisting of YIQ, YUV add L*a*b*.

15. A method for processing an image, comprising the steps of:
generating luminance information and color information representing a color image;
encoding the luminance information and the color information in units of blocks each consisting of a plurality of pixels; and
outputting encoded luminance information and encoded color information,
wherein said outputting step is selectively performed in either a first output mode, in which encoded color information of a block is output prior to encoded luminance information corresponding to that block, or a second output mode, in which encoded color information of a block is output after encoded luminance corresponding to the block.

16. A method according to claim 15, wherein said encoding step includes a conversion step for performing orthogonal transformation.

17. A method according to claim 16, wherein a color space used at the time of performing said orthogonal transformation is selected from the group consisting of YIQ, YUV and L*a*b*.

18. An image processing apparatus comprising:
means for inputting encoded luminance information and encoded color information; and
means for decoding the encoded luminance information and the encoded color information,
wherein said input means has a first input mode, in which encoded color information of a block is input prior to encoded luminance information corresponding to the block, and a second input mode, in which encoded color information of a block is input after encoded luminance information corresponding to the block.

19. An image processing apparatus according to claim 18, wherein the luminance information and color information are subjected to orthogonal transformation by blocks.

20. A method for processing image comprising the steps of:
inputting encoded luminance information and encoded color information; and
decoding the encoded luminance information and encoded color information,
wherein said inputting step is selectively performed in either a first input mode, in which encoded color information of a block is input prior to encoded luminance information corresponding to the block, or a second input mode, in which encoded color information of a block is input after encoded luminance information corresponding to the block.

21. An image processing apparatus according to claim 20, wherein the luminance information and color information are subjected to orthogonal transformation by blocks.

22. An image processing apparatus comprising:
means for generating luminance information and color information representing a color image; and
transmission means for transmitting by predetermined lines the luminance information and the color information,
wherein said transmission means has a first transmission mode, in which the color information is transmitted during transmission of the luminance information corresponding to one line, and a second transmission mode, in which transmission of the luminance information corresponding to one line is consecutively performed.

23. An image processing apparatus according to claim 22, wherein each of said predetermined lines is a block line comprising a plurality of pixel lines.

24. An image processing apparatus according to claim 22, wherein the luminance information signal and the color information are encoded by predetermined blocks.

25. An image processing apparatus according to claim 22, wherein said transmission modes are switched by said predetermined lines.

26. A method for processing an image comprising the steps of:
generating luminance information and color information representing a color image; and
transmitting by predetermined lines the luminance information and the color, information
wherein said transmitting step is selectively performed using either a first transmission mode, in which the color information is transmitted during transmission of the luminance information corresponding to one line, and a second transmission mode, in which a consecutive transmission of the luminance information corresponding to one line is performed.

27. A method according to claim 26, wherein said transmission modes are switched by each of said predetermined lines.

28. An image processing method comprising the steps of:
generating luminance information and color information for each pixel;
dividing the luminance information and the color information into blocks, each having a plurality of pixels;
quantizing the luminance information by using a first quantization step and the color information by using a second quantization step; and
controlling the first quantization step and the second quantization step,
wherein the number of kinds of the first quantization step is larger than the number of kinds of the second quantization step.

* * * * *

UNITED STATES PATENT AND TRADEMARK OFFICE
CERTIFICATE OF CORRECTION

PATENT NO. : 5,422,736　　　　　　　　　　　　　　　　Page 1 of 2
DATED : June 6, 1995
INVENTOR(S) : Akihiro Katayama It is certified that error appears in the above-indentified patent and that said Letters Patent is hereby corrected as shown below:

COLUMN 2

Line 32, "in" should read --in a--.
    Line 56, "information is" should read --color information is input--.

COLUMN 3

Line 34, "decoder 10;" should read --decoder 9;--.

COLUMN 6

Line 63, "adder 2" should read --adder 23--.

COLUMN 7

Line 20, "decoder 10." should read --decoder 9.--.
    Line 31, "circuit 15" should read --circuit 25--.

COLUMN 12

Line 28, "memory 9" should read --memory 13--.
    Line 45, "blocks" should read --blocks,--.

COLUMN 13

Line 4, "quantization" should read --quantization step--.
    Line 24, "block" should read --block and--.
    Line 61, "add" should read --and--.

UNITED STATES PATENT AND TRADEMARK OFFICE
CERTIFICATE OF CORRECTION

PATENT NO. : 5,422,736
DATED : June 6, 1995
INVENTOR(S) : Akihiro Katayama

It is certified that error appears in the above-indentified patent and that said Letters Patent is hereby corrected as shown below:

COLUMN 14

Line 9, "luminance" should read --luminance information--.
Line 34, "image" should read --an image--.
Line 68, "signal" should be deleted.

COLUMN 15

Line 11, "color, information" should read
--color information,--.

Signed and Sealed this

Thirty-first Day of October 1995

Attest:

BRUCE LEHMAN

Attesting Officer       Commissioner of Patents and Trademarks